June 10, 1958 C. A. MORRILL 2,837,890
LINK ASSEMBLY HAVING TWO V-SHAPED PARTS EACH OF
WHICH HAS A LATERAL EXTENDING BEARING
Filed May 31, 1956

INVENTOR.
CHARLES A. MORRILL
BY
ATTORNEY

United States Patent Office 2,837,890
Patented June 10, 1958

2,837,890

LINK ASSEMBLY HAVING TWO V-SHAPED PARTS EACH OF WHICH HAS A LATERAL EXTENDING BEARING

Charles A. Morrill, Cortland, N. Y.

Application May 31, 1956, Serial No. 588,529

5 Claims. (Cl. 59—86)

The present invention relates to links for use, for example, in connecting two pieces of chain, a chain and a fitting, or two fittings.

There is a substantial demand for a flexible and detachable link by which chain sections, fittings and the like can be securely joined, in desired combinations, with ease and convenience on the job and with the thus established joint being capable of functioning as a permanent and as a reusable and detachable link.

The principal objective of the invention is to provide a link adapted to meet these requirements and, in accordance with it, such a link comprises a pair of members, each of which includes a first arm provided with a transversely disposed bearing and a second arm provided with a transversely opening socket. The bearings and sockets are so dimensioned and arranged that they coactively engage on relative movement between the members with the free end of the arm of one member between the free ends of the arms of the other member and with the appropriate bearings and sockets alined. A spacer positioned between the free ends of one pair of corresponding arms of the joined members prevents the unseating of the bearings, and this spacer is connected to the members.

In the accompanying drawings, there is shown an illustrative embodiment of the invention from which these and other of its objectives, novel features, and advantages will be readily apparent.

Figure 1:
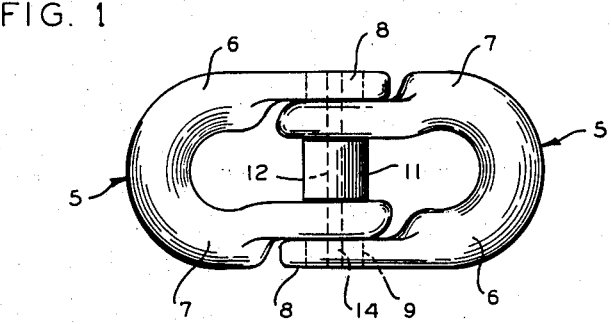
Fig. 1 is a view, in elevation, of a link in accordance with the invention.
Figure 2:
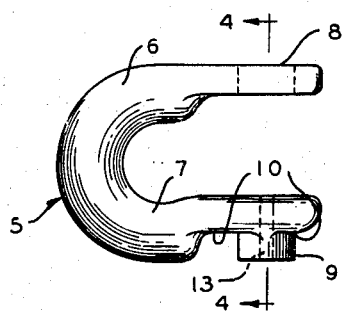
Fig. 2 is a plan view of one of the link members.
Figure 3:
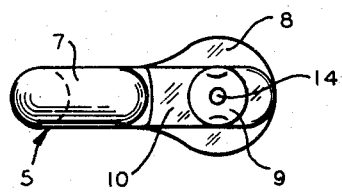
Fig. 3 is an edge view thereof.
Figure 4:
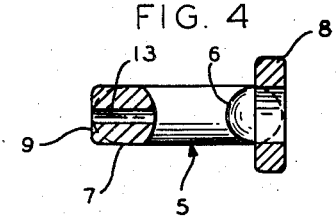
Fig. 4 is a section taken along the indicated lines 4—4 of Fig. 2.

A link, in accordance with the invention, consists of two members, generally indicated at 5 and shown as identical and pivotally interconnected. The members 5 are also shown as being approximately U-shaped and of stock that is of circular cross section except for the free ends of the arms 6 and 7. Conveniently, the link may be a forging.

The arm 6 of each member 5 terminates in a flattened eye portion 8 which defines a socket shown as transversely alined with a cylindrical bearing 9, on its other arm 7, shaped and disposed to enter the socket defined by the eye 8 of the other member. In order for the members 5 to be assembled, they are positioned with one arm of one of the members disposed between the two arms of the other member and with the eye 8 of each member disposed to be entered by the bearing 9 of the other member on relative movement therebetween with the eyes and bearings appropriately alined.

In the embodiment of the invention shown in the drawings, the bearings 9 are established by removing stock, from the free end of each arm 7, to an extent approximately equal to the thickness of an eye 8 thus to provide a flat seat 10 offset so that, in the assembled link, the arms 6 and 7 of one member are in the same respective planes as the arms 7 and 6 of the other member.

In order to prevent the unseating of the members 5, a spacer 11 is disposed between the corresponding arms of the members that are proximate to each other in the assembled link and it will be noted that the spacer 11 and the bearings 9 have axial bores 12 and 13 respectively. When these bores are alined, a connecting element 14, conveniently of rivet form, is inserted therethrough and headed over. While any type of connecting element may be used, that which can be readily detached is preferred as disassembly of the links is an important feature of the invention.

It will be noted that with a link in accordance with the invention, all strain between the connected members 5 is borne by the bearings and sockets which afford full strength for the size chain for which it is to be used. This objective is attained while maintaining the arm that has the bearing, of a size and shape that will enable it to pass through the appropriate size of chain. In other words, the formation of the bearings 9 in the manner shown and described, avoids the necessity of having openings in fittings and chains that are large relative to the cross sectional dimensions of the arms 7. In addition, when, as shown, the bearings and sockets are all transversely alined, flexibility is also attained with each member being capable of swinging through an arc of more than 180° relative to the other.

What I therefore claim and desire to secure by Letters Patent is:

1. A link comprising a pair of identical forged members, each including a semi-circular body portion and a pair of parallel arms integral therewith and extending from the ends of said body portion, each of said arms being substantially of equal length and of substantially one half the thickness of said body portion and off-set in the same direction from the ends of said body portion with the outer surface of one arm and the inner surface of the other arm substantially aligned with the corresponding surfaces of the ends of said body portion, the opposite surfaces of each said arm being flattened to form parallel engaging surfaces substantially centrally of the ends of said body portion and in planes perpendicular to the plane of said body portion, a cylindrical bearing integral with one of said arms and extending perpendicularly from one of said bearing surfaces, a cylindrical opening extending through the other of said arms in line with said bearing, said bearing and opening each substantially corresponding in diameter to the thickness of said body portion, the bearing of each member extending substantially through and being pivotally engaged in the opening of the other member with respective engaging surfaces abutting, a spacer between and engaging said members and in alignment with said bearing members, an opening extending through said bearings and spacer, said opening being not greater in diameter than one-third the diameter of said bearings and means in said opening maintaining said members and spacer assembled.

2. The link of claim 1 in which the arms having the opening therethrough are laterally enlarged to form ring-like portions.

3. The link of claim 2 in which the arms are connected to the respective ends of the body portions by smoothly rounded portions.

4. The link of claim 1 in which the body portions are substantially circular in cross section.

5. The link of claim 4 in which the inner diameter of the semi-circular body portions are slightly greater than the cross sectional diameter of said body portion.

References Cited in the file of this patent

UNITED STATES PATENTS

| | | |
|---|---|---|
| 550,417 | Miller | Nov. 26, 1895 |
| 639,575 | Holmes | Dec. 19, 1899 |
| 2,369,344 | Ehmann | Feb. 13, 1945 |
| 2,525,194 | Anderson | Oct. 10, 1950 |

FOREIGN PATENTS

| | | |
|---|---|---|
| 438,977 | Great Britain | Nov. 27, 1935 |
| 1,064,570 | France | Dec. 23, 1953 |